(12) United States Patent
Hayashi

(10) Patent No.: US 6,903,856 B2
(45) Date of Patent: Jun. 7, 2005

(54) OPTICAL SCANNING DEVICE DECREASING AMOUNT OF CHANGE IN RELATIVE SCANNING POSITION

(75) Inventor: Yoshinori Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/028,698

(22) Filed: Dec. 28, 2001

(65) Prior Publication Data

US 2002/0100869 A1 Aug. 1, 2002

(30) Foreign Application Priority Data

Dec. 28, 2000 (JP) .................................... 2000-402660

(51) Int. Cl.⁷ ............................................ G02B 26/08
(52) U.S. Cl. ...................................................... 359/204
(58) Field of Search .............................. 359/204, 212; 347/233, 241–244

(56) References Cited

U.S. PATENT DOCUMENTS

| | | | |
|---|---|---|---|
| 4,561,717 A | * 12/1985 | Kataoka et al. ............. 359/204 |
| 4,726,640 A | 2/1988 | Iwama et al. |
| 5,017,987 A | 5/1991 | Nanjoh et al. |
| 5,069,515 A | 12/1991 | Itami et al. |
| 5,108,843 A | 4/1992 | Ohtaka et al. |
| 5,304,357 A | 4/1994 | Sato et al. |
| 5,408,113 A | 4/1995 | Kanno et al. |
| 5,448,113 A | 9/1995 | Suzuki et al. |
| 5,453,650 A | 9/1995 | Hashimoto et al. |
| 5,508,477 A | 4/1996 | Kato et al. |
| 5,510,664 A | 4/1996 | Suzuki et al. |
| 5,557,448 A | 9/1996 | Endo et al. |
| 5,570,224 A | 10/1996 | Endo et al. |
| 5,574,591 A | 11/1996 | Suzuki et al. |
| 5,581,392 A | 12/1996 | Hayashi |
| 5,606,448 A | 2/1997 | Suzuki et al. |
| 5,612,599 A | 3/1997 | Itami et al. |
| 5,633,523 A | 5/1997 | Kato |
| 5,652,670 A | 7/1997 | Hayashi |
| 5,668,413 A | 9/1997 | Nanjo |
| 5,715,078 A | * 2/1998 | Shiraishi ...................... 359/204 |
| 5,726,699 A | 3/1998 | Itami et al. |
| 5,739,602 A | 4/1998 | Suzuki et al. |
| 5,769,544 A | 6/1998 | Suzuki et al. |
| 5,774,249 A | * 6/1998 | Shiraishi et al. ............ 359/205 |
| 5,811,353 A | 9/1998 | Nanjo |

(Continued)

FOREIGN PATENT DOCUMENTS

JP         10-26732          1/1998

*Primary Examiner*—Euncha P. Cherry
(74) *Attorney, Agent, or Firm*—Oblon, Spivak, McClelland, Maier & Neustadt, P.C.

(57) ABSTRACT

An optical scanning device includes a plurality of scanning optical systems configured to scan different scanning surfaces. Each of the scanning optical systems includes a light source configured to emit a light flux, a deflector configured to scan the light flux emitted from the light source, wherein the deflector is commonly used in the plurality of scanning optical systems. Each of the scanning optical systems further includes a scanning lens configured to condense the scanned light flux to the scanning surface, an optical path inflection mirror configured to inflect the scanned light flux, and an imaging lens configured to lead the light flux emitted from the light source to the deflector. The plurality of scanning optical systems are provided at both sides of the deflector having the deflector therebetween such that one each of the scanning optical systems at both sides of the deflector include a set of the optical scanning system and respective light fluxes scanned by the deflector in the set of the optical scanning system become approximately parallel in a main scanning direction, and an expression, $|N-M|=2k+1$ is satisfied when the number of optical path inflection mirrors provided in each of the set of scanning optical systems is represented by "N" (i.e., $N \geq 2$) and "M" (i.e., $M \geq 1$), and "k" is an integer equal to zero or larger.

7 Claims, 7 Drawing Sheets

U.S. PATENT DOCUMENTS

| | | | |
|---|---|---|---|
| 5,875,051 A | 2/1999 | Suzuki et al. | |
| 5,909,966 A | 6/1999 | Suzuki et al. | |
| 5,969,844 A | 10/1999 | Itami et al. | |
| 5,986,791 A | 11/1999 | Suzuki et al. | |
| 5,999,345 A | 12/1999 | Nakajima et al. | |
| 6,069,724 A | 5/2000 | Hayashi et al. | |
| 6,078,419 A | 6/2000 | Atsuumi | |
| 6,081,386 A | 6/2000 | Hayashi et al. | |
| 6,104,522 A | 8/2000 | Hayashi et al. | |
| 6,141,133 A | 10/2000 | Suzuki et al. | |
| 6,150,698 A | 11/2000 | Ohtsuka et al. | |
| 6,150,779 A | 11/2000 | Itami et al. | |
| 6,166,842 A | 12/2000 | Aoki et al. | |
| 6,185,026 B1 | 2/2001 | Hayashi et al. | |
| 6,188,086 B1 | 2/2001 | Masuda et al. | |
| 6,198,562 B1 | 3/2001 | Hayashi et al. | |
| 6,198,563 B1 | 3/2001 | Atsuumi | |
| 6,215,974 B1 | 4/2001 | Katoh et al. | |
| 6,222,662 B1 | 4/2001 | Suzuki et al. | |
| 6,229,638 B1 | 5/2001 | Sakai et al. | |
| 6,233,081 B1 | 5/2001 | Suzuki et al. | |
| 6,256,133 B1 | 7/2001 | Suzuki et al. | |
| 6,281,609 B1 | 8/2001 | Itami et al. | |
| 6,288,819 B1 | 9/2001 | Aoki et al. | |
| 6,312,108 B1 | 11/2001 | Kato | |
| 6,324,149 B1 | 11/2001 | Mifune et al. | |
| 6,332,669 B1 | 12/2001 | Kato et al. | |
| 6,347,004 B1 | 2/2002 | Suzuki et al. | |
| 6,348,988 B2 | 2/2002 | Aoki et al. | |
| 6,348,989 B2 | 2/2002 | Aoki et al. | |
| 6,359,717 B2 | 3/2002 | Suzuki et al. | |
| 6,366,384 B1 | 4/2002 | Aoki et al. | |
| 6,367,914 B1 | 4/2002 | Ohtaka et al. | |
| 6,376,837 B1 | 4/2002 | Itabashi et al. | |
| 6,381,057 B1 | 4/2002 | Itabashi | |
| 6,384,949 B1 | 5/2002 | Suzuki | |
| 6,388,792 B1 | 5/2002 | Atsuumi et al. | |
| 6,400,917 B2 | 6/2002 | Nakazato et al. | |
| 6,417,509 B1 | 7/2002 | Atsuumi et al. | |
| 6,429,956 B2 | 8/2002 | Itabashi | |
| 6,445,482 B1 | 9/2002 | Hayashi | |
| 6,459,520 B1 * | 10/2002 | Takayama | 359/204 |
| 6,465,918 B1 | 10/2002 | Itami et al. | |
| 6,469,772 B1 | 10/2002 | Itabashi | |
| 6,498,617 B1 | 12/2002 | Ishida et al. | |

* cited by examiner

OPTICAL SCANNING DEVICE DECREASING AMOUNT OF CHANGE IN RELATIVE SCANNING POSITION

BACKGROUND OF THE INVENTION

1. Field of the Invention

The present invention relates to an optical scanning device and an image forming apparatus using the optical scanning device, and more particularly to the optical scanning device in which an amount of change in a relative scanning position of each scanning optical system, which is caused by a temperature fluctuation, is decreased.

2. Discussion of the Background

An image forming apparatus, in which a plurality of photoconductive elements are scanned by single optical scanning device is commonly known. The image forming apparatus includes, for example, a color printer having a plurality of photoconductive drums, a color copier having a plurality of photoconductive drums, a high speed laser printer, a digital copier and so forth. In the above-described image forming apparatuses, a high speed print of a color image is performed because individual photoconductive elements corresponding to each color are provided. In addition, the number of parts used including a deflector and a consumption of an electric power are decreased because a single optical scanning device is commonly used for scanning the plurality of photoconductive elements.

In the above type of image forming apparatus, a lens made of a resin, which has a positive power only in a sub-scanning direction, is used as an imaging lens to form a linear image in the vicinity of a deflecting surface of a deflector. Hereinafter, a direction in which beam light emitted from a light source is deflected by the deflector is referred to as a main scanning direction. A direction perpendicular to the main scanning direction and in which a transfer sheet is conveyed is referred to as a sub-scanning direction. As the imaging lens, a lens made of a resin is commonly used instead of a lens made of a glass to reduce costs for a material itself and processing of the material.

However, because the resin lens has a high linear expansion coefficient, an optical axis of the lens changes in a sub-scanning direction when a surrounding temperature fluctuates. Thus, a scanning position on a surface of a photoconductive element changes in the sub-scanning direction. If a direction of change of the scanning position in the sub-scanning direction is different on each photoconductive element, a color shift is created, resulting in a degradation of a produced image.

In Japanese Patent Laid-Open Publication No. 10-26732, an optical scanning device and an image forming apparatus using the optical scanning device in which a hybrid cylinder lens, which is integrally produced with a resin lens having a negative power in the sub-scanning direction and a glass lens having a positive power in the sub-scanning direction are disclosed. The hybrid cylinder lens is employed to reduce an image surface bulge fluctuation caused by the temperature fluctuation. However, the image surface bulge fluctuation in the sub-scanning direction is caused by the temperature fluctuation even if the hybrid cylinder lens is employed because a resin has a linear expansion coefficient higher than that of a glass.

SUMMARY OF THE INVENTION

The present invention has been made in view of the above-mentioned and other problems and addresses the above-discussed and other problems.

The present invention advantageously provides a novel optical scanning device and an image forming apparatus using the optical scanning optical device in which an amount of change in a relative scanning position of each scanning optical system is decreased by aligning a direction of change of the scanning position in a sub-scanning direction caused by a temperature fluctuation in a plurality of scanning optical systems.

According to an example of the present invention, the optical scanning device includes a plurality of scanning optical systems configured to scan different scanning surfaces. Each of the scanning optical systems includes a light source configured to emit a light flux, a deflector configured to scan the light flux emitted from the light source, wherein the deflector is commonly used in the plurality of scanning optical systems. Each of the scanning optical systems further includes a scanning lens configured to condense the scanned light flux to the scanning surface, an optical path inflection mirror configured to inflect the scanned light flux, and an imaging lens configured to lead the light flux emitted from the light source to the deflector.

Scanning optical systems are provided at both sides of the deflector, that is, the deflector is between a pair of scanning optical systems. Each of the scanning optical systems comprises a set of an optical scanning system and respective light fluxes scanned by the deflector, the set of the optical scanning system being approximately parallel in a main scanning direction. The expression, $|N-M|=2k+1$ is satisfied when the number of optical path inflection mirrors provided in each of the set of scanning optical systems is represented by "N" (i.e., $N \geq 2$) and "M" (i.e., $M \geq 1$), and "k" is an integer equal to zero (0) or larger.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
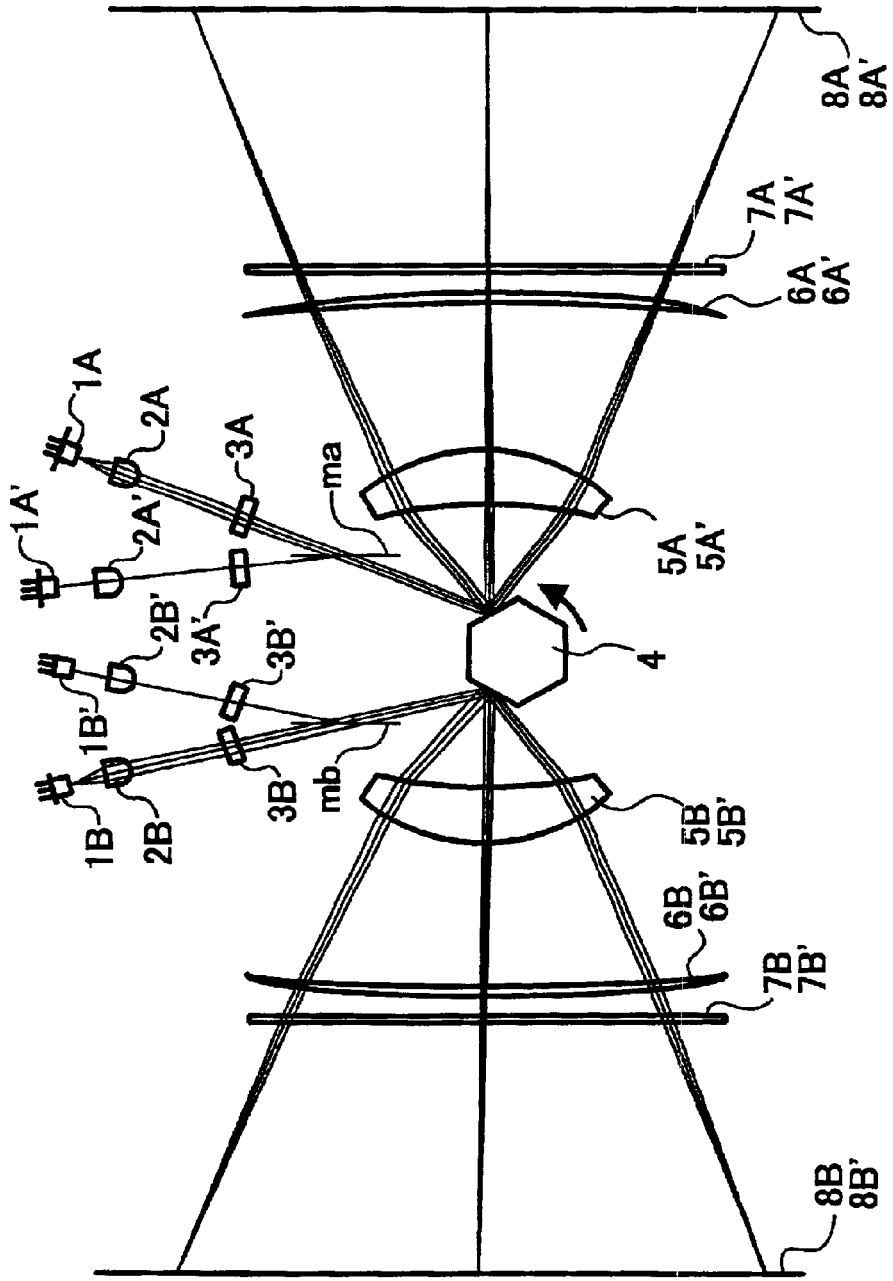
FIG. 1 is a diagram illustrating a layout of an optical system of an optical scanning device in a plane parallel to a rotating plane of a deflector.

Referring now to the drawings, wherein like reference numerals designate identical or corresponding parts throughout the several views, an optical scanning device and an image forming apparatus according to an example of the present invention are described below referring to figures. FIG. 1 is a diagram illustrating a layout of an optical system of an optical scanning device in a plane parallel to a rotating plane of a deflector. The optical scanning device includes four scanning optical systems A, A', B, and B'. Reference numerals 1A, 1A', 1B, 1B', and 2A, 2A', 2B, 2B' denote a semiconductor laser as a light source, and coupling lens, respectively. Reference numerals 3A, 3A', 3B, 3B', and 4 denote an imaging lens made of a resin (hereinafter referred to as a resin lens), and a deflector, respectively.

In addition, reference numerals 5A, 5A', 5B, 5B', and 6A, 6A', 6B, 6B' represent a first and second scanning lenses, respectively. Reference numerals 7A, 7A', 7B, 7B' represent a soundproofing glass. The scanning optical systems A, A', B, B' include respective above-described optical elements. However, the deflector 4 is the element that is common to the scanning optical systems A, A', B, B'. The deflector 4 includes, for example, a polygon mirror and rotates at a constant speed in a direction indicated by an arrow in FIG. 1. Reference numerals 8A, 8A', 8B, 8B', and "ma", "mb" denote a photoconductive element (i.e., a surface of which is scanned), and a mirror, respectively.

The mirror "ma" inflects a light flux emitted from the semiconductor laser 1A' to the deflector 4. The mirror "mb" leads a light flux emitted from the semiconductor laser 1B' to the deflector 4. A light flux emitted from the semiconductor laser 1A is led to the deflector 4 without being inflected by the mirror "ma". A light flux emitted from the semiconductor laser 1B is led to the deflector 4 without being inflected by the mirror "mb". An optical path inflection mirror provided after the deflector 4 is not shown in FIG. 1. In the example illustrated in FIG. 1, one light source is provided for each scanning optical system. However, a plurality of light sources may be employed for each scanning optical system.

The scanning optical systems A and B are a set of scanning optical system and are provided at both sides of the deflector 4 having the deflector 4 therebetween such that light fluxes scanned by the deflector 4 become approximately parallel in a main scanning direction. Namely, the light fluxes emitted from the semiconductor lasers 1A and 1B, which are positioned above the deflector 4 in FIG. 1, are reflected by the deflector 4 toward the right side and the left side in FIG. 1 in the scanning optical systems A and B, respectively. Thus, the light fluxes scanning a surface of the photoconductive elements 8A and 8B become approximately parallel in the main scanning direction.

Hereinafter, a direction in which the light fluxes emitted from the semiconductor lasers 1A, 1A', 1B, and 1B' (i.e., light sources) are deflected by the deflector 4 is referred to as the main scanning direction. The direction which is orthogonal to the main scanning direction is referred to as the sub-scanning direction. In FIG. 1, the set of scanning optical system includes a combination of the scanning optical systems A and B', A' and B, A' and B' besides the above-described combination of the scanning optical systems A and B.

The scanning optical systems A and A' are arranged in the sub-scanning direction having a distance therebetween. Similarly the scanning optical systems B and B' are arranged in the sub-scanning direction having a distance therebetween. Namely, scanning optical systems are arranged at both sides of the deflector 4 having the deflector 4 therebetween and a plurality of scanning optical systems are arranged in the sub-scanning direction at both sides of the deflector 4.

Each diverging light flux emitted from each semiconductor laser 1A, 1A', 1B, and 1B' is coupled by the respective coupling lenses 2A, 2A', 2B, and 2B'. The light flux passed the respective coupling lenses 2A, 2A', 2B, and 2B' then passes respective resin imaging lenses 3A, 3A', 3B, and 3B', which have a positive power only in the sub-scanning direction, to form a linear image in the vicinity of a deflecting surface of the deflectors 4.

Figure 2:
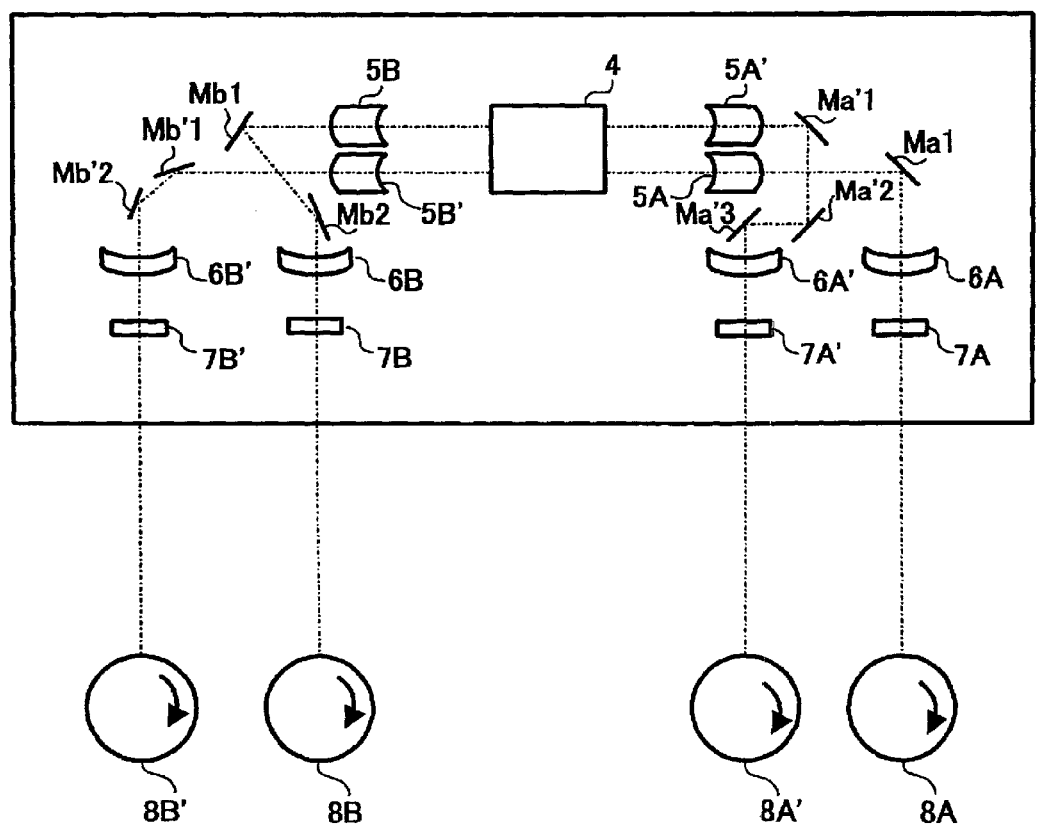
FIG. 2 is a diagram illustrating a sectional view of a scanning optical system in the sub-scanning direction arranged after the deflector.

FIG. 2 is a diagram illustrating a sectional view of the scanning optical system in the sub-scanning direction arranged after the deflector 4. Each light flux deflected by the deflector 4 is led to the photoconductive elements 8A, 8A', 8B, and 8B' after passing the first scanning lenses 5A, 5A', 5B, and 5B', the second scanning lenses 6A, 6A', 6B, and 6B', and the soundproofing glasses 7A, 7A', 7B, and 7B' so as to form an image as a light spot on the surface of the respective photoconductive elements 8A, 8A', 8B, and 8B' while scanning the surface thereof approximately at the same speed. An optical path inflection mirror is provided in a light flux path between the first and second scanning lenses in each scanning optical system A, A', B, and B'. The optical path inflection mirror leads each light flux deflected by the deflector 4 to the respective photoconductive elements 8A, 8A', 8B, and 8B'.

An arrangement of the optical path inflection mirror in each scanning optical system A, A', B, and B' is described below. One piece of optical path inflection mirror Ma1 is provided in the scanning optical system A to reflect the light flux from the first scanning lens 5A approximately at the right angle toward the lower direction in FIG. 2. Three optical path inflection mirrors Ma'1, Ma'2, and Ma'3 are provided in the scanning optical system A'. The optical path inflection mirror Ma'1 reflects the light flux from the first scanning lens 5A' approximately at the right angle toward the lower direction in FIG. 2. The optical path inflection mirror Ma'2 reflects the light flux from the optical path inflection mirror Ma'1 approximately at the right angle toward the left in FIG. 2. The optical path inflection mirror Ma'3 reflects the light flux from the optical path inflection mirror Ma'2 approximately at the right angle toward the lower direction in FIG. 2.

Two optical path inflection mirrors Mb1 and Mb2 are provided in the scanning optical system B. The optical path inflection mirrors Mb1 reflects the light flux from the first scanning lens 5B toward a lower right direction in FIG. 2. The optical path inflection mirror Mb2 reflects the light flux from the optical path inflection mirror Mb1 toward the lower direction in FIG. 2. Two optical path inflection mirrors Mb'1 and Mb'2 are provided in the scanning optical system B'. The optical path inflection mirrors Mb'1 reflects the light flux from the first scanning lens 5B' toward the lower left direction in FIG. 2. The optical path inflection mirror Mb'2 reflects the light flux from the optical path inflection mirror Mb'1 toward the lower direction in FIG. 2. The optical path inflection mirror in each scanning optical system is not necessarily positioned between the first and second scanning lenses but may be arranged at any position between the deflector 4 and the respective photoconductive element 8A, 8A', 8B and 8B'.

Figure 3:
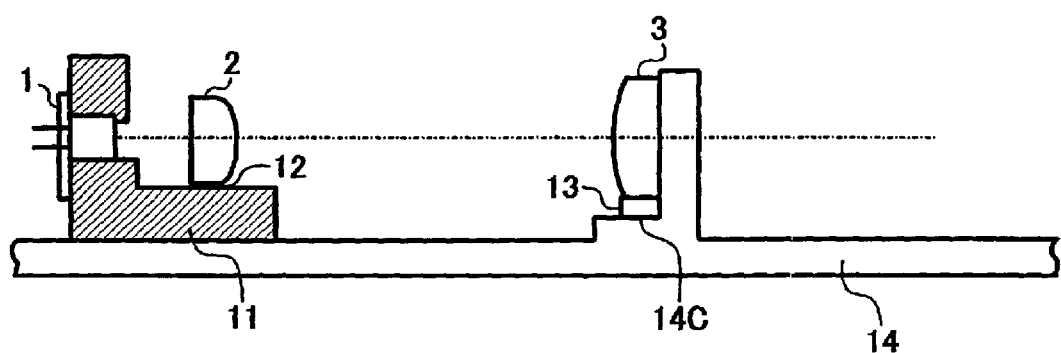
FIG. 3 is a diagram illustrating a sectional view of an example of the scanning optical system in the sub-scanning direction arranged before the deflector.

FIG. 3 is a diagram illustrating a sectional view of an example of the scanning optical system in the sub-scanning direction arranged before the deflector 4. Reference numerals 1, 2, and 3 denote the semiconductor laser, the coupling lens, and the resin imaging lens having a positive power in the sub-scanning direction to form a linear image, respectively. Reference numerals 11, 14, and 14C represent a light source unit pedestal, a housing, and a supporting surface, respectively. Reference numerals 12 and 13 denote adhesives.

The semiconductor laser 1 is force-fitted and fixed to the light source unit pedestal 11. The coupling lens 2 is provided to the light source unit pedestal 11 with the adhesive 12 after a position of the coupling lens 2 is adjusted. The light source unit pedestal 11 and resin imaging lens 3 are provided to the housing 14. The resin imaging lens 3 is provided to the housing 14 with the adhesive 13.

Figure 4:
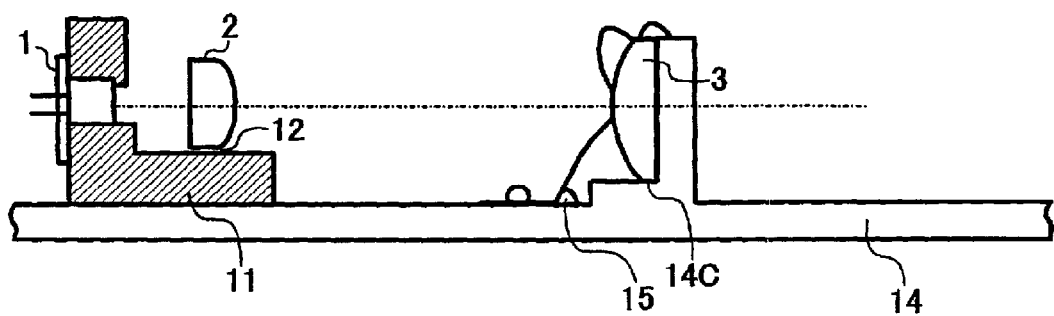
FIG. 4 is a diagram illustrating a sectional view of another example of the scanning optical system in the sub-scanning direction arranged before the deflector.

FIG. 4 is a diagram illustrating a sectional view of another example of the scanning optical system in the sub-scanning direction arranged before the deflector 4. The resin imaging lens 3 is provided to the housing 14 while being pressed from an upper end portion thereof toward the supporting surface 14C by a flat spring 15.

Figure 5:
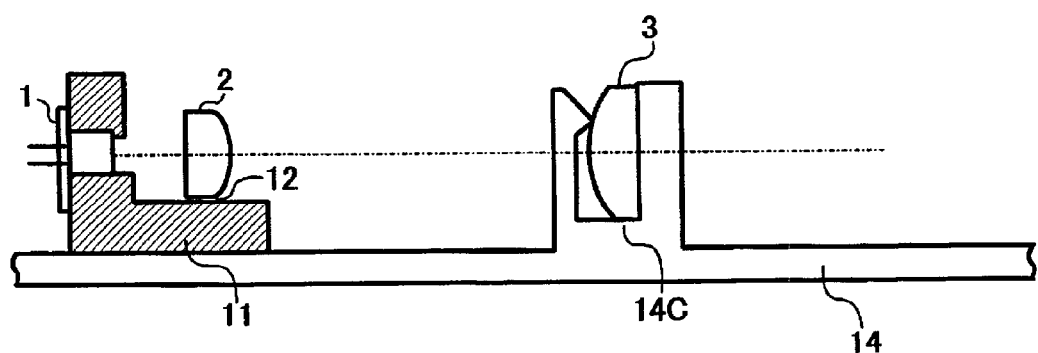
FIG. 5 is a diagram illustrating a sectional view of another example of the scanning optical system in the sub-scanning direction arranged before the deflector.

FIG. 5 is a diagram illustrating a sectional view of another example of the scanning optical system in the sub-scanning direction arranged before the deflector 4. The resin imaging lens 3 is force-fitted to the housing 14 making the supporting surface 14C as a datum level.

Figure 6:
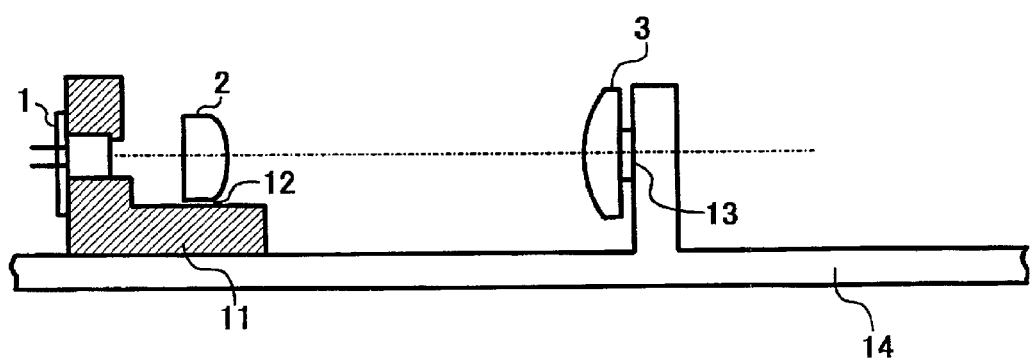
FIG. 6 is a diagram illustrating a sectional view of another example of the scanning optical systems in the sub-scanning direction arranged before the deflector.

FIG. 6 is a diagram illustrating a sectional view of another example of the scanning optical system in the sub-scanning direction arranged before the deflector 4. The resin imaging lens 3 is provided to the housing 14 with the adhesive 13. The adhesive 13 is applied to a position adjacent to the optical axis of the resin imaging lens 3 unlike the example illustrated in FIG. 3.

In a conventional optical scanning device, a linear image forming element includes a glass lens. A material cost is high for the glass lens, and a processing cost is increased because the processes performed by a machine, such as a cutting and polishing are involved. However, a degree of a change of the optical axis of the glass lens in the sub-scanning direction caused by a temperature fluctuation is not significant because a linear expansion coefficient of a glass is maintained within a range of about 5.0E-06 (1/° C.) and 10.0E-06 (1/° C.). When a lens made of a resin is used as the linear image forming element, a cost for a material is kept low and a processing cost is decreased because the processes are performed easily, resulting in a reduction in costs. However, the degree of the change of the optical axis of the resin lens in the sub-scanning direction caused by the temperature fluctuation becomes significant because the linear expansion coefficient becomes high, i.e., about 7.0E-05 (1/° C.).

In a structure of fixing a lens illustrated in FIGS. 3 to 5, the optical axis of the lens changes according to a expansion or a shrinkage of the resin imaging lens 3 caused by the temperature fluctuation. Thus, a degree of a change of a scanning position on a surface of a photoconductive element in the sub-scanning direction becomes significant. A resin including aluminum or glass fiber is used as a material for the housing 14. These materials have a linear expansion coefficient of 2.0E-05 (1/° C.) which is higher than that of a glass. In the lens fixing structure illustrated in FIG. 6, the scanning position significantly changes in the sub-scanning direction according to a expansion or a shrinkage of the housing 14 even if the resin imaging lens 3 is made of a glass.

Figure 7:
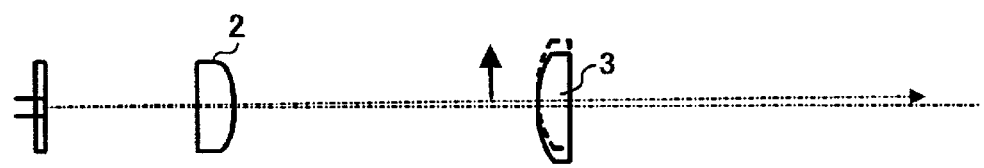
FIG. 7 is a diagram illustrating a sectional view of the scanning optical system in the sub-scanning direction showing a change of an optical axis due to a temperature fluctuation.

FIG. 7 is a diagram illustrating a sectional view of a scanning optical system in a sub-scanning direction showing a change of an optical axis due to a temperature fluctuation. As illustrated in FIGS. 3 to 6, if the resin imaging lens 3 is fixedly provided directly to the housing 14 before the deflector 4, the change of the scanning position in the sub-scanning direction becomes significant irrespective of the lens fixing structure.

Figure 8:
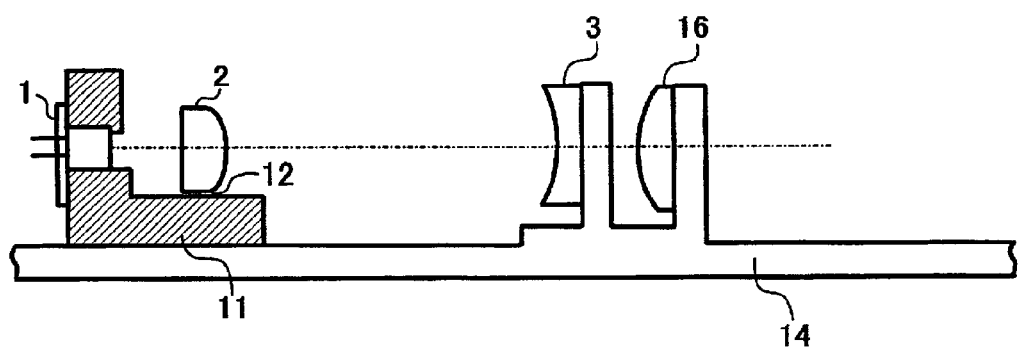
FIG. 8 is a diagram illustrating a sectional view of another example of the scanning optical systems in the sub-scanning direction arranged before the deflector.

As illustrated in FIG. 8, when an image forming lens includes the resin imaging lens 3 and a glass lens 16, the degree of the change of the scanning position in the sub-scanning direction caused by a temperature fluctuation is reduced. However, because a liner expansion coefficient of a resin is higher than that of a glass, the change of the scanning position in the sub-scanning direction due to the temperature fluctuation is not prevented.

The present invention accommodates the change of the scanning position in the sub-scanning direction since changes in the scanning position caused by temperature fluctuation are inevitable. According to the present invention, a direction of the change of the scanning position, which is caused by the temperature fluctuation, is aligned in a plurality of scanning optical systems. With this arrangement, a degree of the change of the scanning position in the sub-scanning direction is reduced in the plurality of scanning optical systems.

Figure 9:
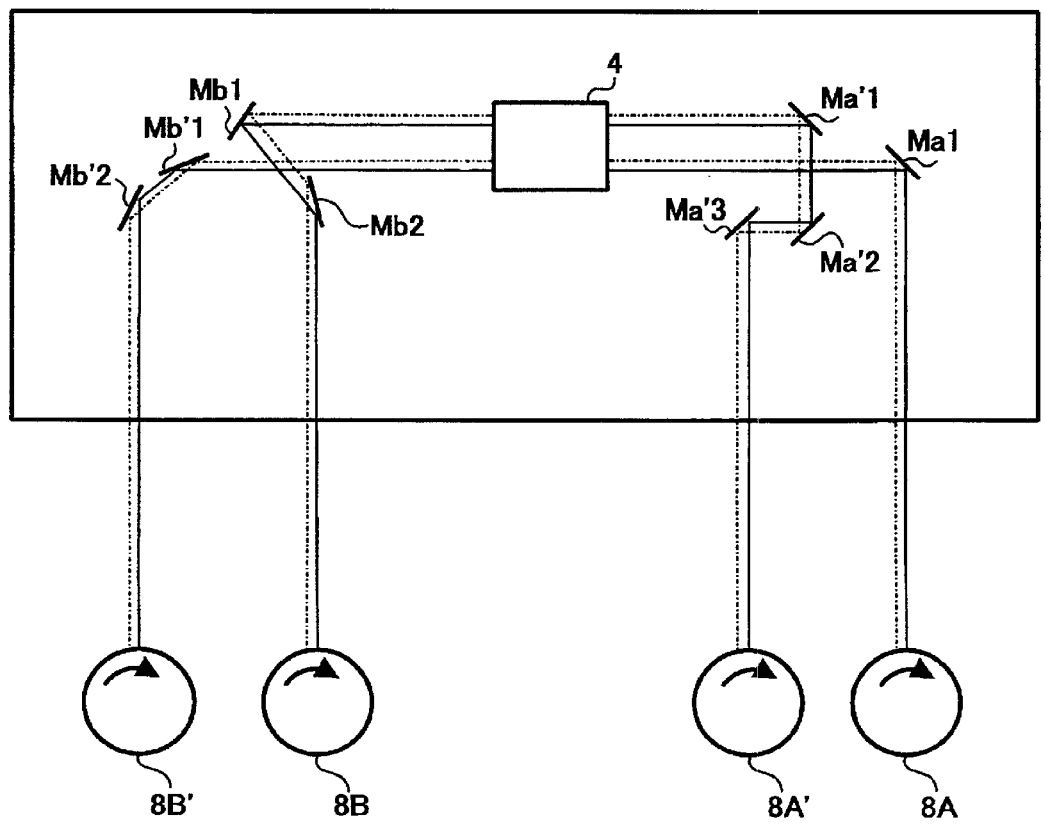
FIG. 9 is a diagram illustrating a sectional view of the scanning optical system in the sub-scanning direction after the deflector.

FIG. 9 is a diagram illustrating a sectional view of the scanning optical system in the sub-scanning direction after the deflector 4. Photoconductive elements 8A, 8A', 8B, and 8B' rotate in a clockwise direction. In FIG. 9, a solid line indicates main rays of light in an ordinary temperature while a chained line indicates main rays of light when the temperature is fluctuated. In each scanning optical system, main rays of light in the fluctuated temperature is shifted in an upward direction in FIG. 9 with respect to main rays of light in the ordinary temperature. In the scanning optical systems A and A', the shifting of main rays of light in the fluctuated temperature results in the shifting toward the front side of the main rays of light in the normal temperature with respect to the rotating direction of the photoconductive elements 8A and 8A'.

In the scanning optical systems B and B', the shifting of main rays of light in the fluctuated temperature results in the shifting toward the back side of the main rays of light in the normal temperature with respect to the rotating direction of the photoconductive elements 8B and 8B'. In FIG. 9, a description of first and second scanning lenses 5A, 5A', 5B, 5B', 6A, 6A', 6B, and 6B' are omitted for a purpose of a simplification.

The position of main rays of light in the fluctuated temperature on a surface of a photoconductive element is reversed with respect to the position of main rays of light in the normal temperature, when an optical path inflection mirror is employed. For example, in the scanning optical system A, main rays of light in the fluctuated temperature shifts toward the front side of main rays of light in the ordinary temperature with respect to the rotating direction of the photoconductive element 8A between the deflector 4 and the optical path inflection mirror Ma1.

To the contrary, between the optical path inflection mirror Ma1 and the photoconductive element 8A, main rays of light in the fluctuated temperature shifts toward the back side of main rays of light in the ordinary temperature with respect to the rotating direction of the photoconductive element 8A. The position of main rays of light in the fluctuated temperature is reversed by the optical path inflection mirror Ma1 with respect to main rays of light in the ordinary temperature. The optical path inflection mirror Ma1 shifts main rays of light in the fluctuated temperature toward the back side of main rays of light in the ordinary temperature with respect to the rotating direction of the photoconductive element 8A.

As described above, the description of first and second scanning lenses 5A, 5A', 5B, 5B', 6A, 6A', 6B, and 6B' are omitted for a purpose of a simplification in FIG. 9. In addition, although main rays of light in the fluctuated temperature is indicated to shift parallel to main rays of light in the ordinary temperature, main rays of light in the fluctuated temperature may not always shift parallel to main rays of light in the ordinary temperature, and a gradient of main rays of light in the fluctuated temperature in FIG. 9 may vary according to a fluctuation of a temperature. However, even if main rays of light in the fluctuated temperature does not shift parallel to main rays of light in the ordinary temperature, an optical path inflection mirror shifts main rays of light in the fluctuated temperature toward the back side of main rays of light in the ordinary temperature with respect to the rotating direction of the photoconductive element 8A.

A direction of a shifting of a scanning position in a sub-scanning direction caused by a temperature fluctuation in a set of scanning optical system provided at both sides of the deflector 4 is described below. For example, in a set of the scanning optical systems A and B', in the scanning optical system A, main rays of light in the fluctuated temperature shifts toward the front side of main rays of light in the ordinary temperature with respect to the rotating direction of the photoconductive element 8A between the deflector 4 and the optical path inflection mirror Ma1.

In the scanning optical system B', main rays of light in the fluctuated temperature shifts toward the back side of main rays of light in the ordinary temperature with respect to the rotating direction of the photoconductive element 8B' between the deflector 4 and the optical path inflection mirror Mb'1. The following expression should be satisfied to align a direction of change of a scanning position in a sub-scanning direction caused by a temperature fluctuation in scanning optical systems A and B':

$$|N-M|=2k+1 \quad (1)$$

In expression (1), the number of optical path inflection mirrors provided in scanning optical systems B' and A is respectively represented by "N" (i.e., $N \geq 2$) and M (i.e., $M \geq 1$), for "k" being an integer equal to 0 or larger.

The number of optical path inflection mirrors provided in the scanning optical systems A and B' is one piece and two pieces, respectively. As such, the above-described expression is satisfied. Hence, the direction of change of the scanning position in the sub-scanning direction caused by the temperature fluctuation aligns in scanning optical systems A and B'.

As described above, in an optical scanning device having a plurality of scanning optical systems A and B', an amount of change in a relative scanning position of each scanning optical system is decreased. The respective scanning optical systems A and B' include the semiconductor laser 1A or 1B', the deflector 4, scanning lenses 5A and 6A or 5B' and 6B', optical path inflection mirrors Ma1 or Mb'1 and Mb'2, and imaging lenses 3A or 3B'. The scanning lenses 5A, 6A, 5B', and 6B' condense rays of scanning light to a surface of a photoconductive element. The imaging lenses 3A and 3B' lead rays of light emitted from the semiconductor laser 1A or 1B' to the deflector 4. The deflector 4 scans rays of light emitted from the semiconductor laser 1A or 1B' and is commonly used in the scanning optical systems A and B'. The scanning optical systems A and B' are arranged as a set at both sides of the deflector 4 having the deflector 4 therebetween such that respective light fluxes scanned by the deflector 4 become approximately parallel in a main scanning direction.

If the number of optical path inflection mirrors in the scanning optical systems B' and A (i.e., "N" and "M", respectively) is arranged to satisfy the expression of: $|N-M|=2k+1$ (i.e., $N \geq 2$, $M \geq 1$, and "k" is an integer equal to 0 or larger), a direction of change of a scanning position in a sub-scanning direction caused by a temperature fluctuation aligns in scanning optical systems A and B'. This is true even if an optical axis of the imaging lenses 3A and 3B' changes due to the temperature fluctuation. Thus, an amount of change in a relative scanning position of each scanning optical system is decreased. Further, because the deflector 4 is commonly used in the scanning optical systems A and B', the number of parts used and a consumption of an electric power are decreased.

Another example of a set of the scanning optical systems (i.e., A and B, A' and B, and A' and B'), which are arranged as the set at both sides of the deflector 4 having the deflector 4 therebetween, are described below. The number of optical path inflection mirrors provided in the scanning optical systems A and B is one piece and two pieces, respectively that satisfies the above-described expression (1). The number of optical path inflection mirrors provided in the scanning optical systems A' and B is three pieces and two pieces, respectively thus satisfying expression (1) described above. In the scanning optical systems A' and B', three and two pieces of optical path inflection mirrors are provided, respectively that satisfies the above-described expression (1). Thus, a direction of change of a scanning position in a sub-scanning direction caused by a temperature fluctuation aligns in respective sets of the scanning optical systems (i.e., A and B, A' and B, and A' and B').

As described above, if the number of optical path inflection mirrors provided in each set of the scanning optical systems satisfies the expression (1), the direction of change of the scanning position in the sub-scanning direction caused by the temperature fluctuation aligns in each set of the scanning optical systems. Thus, an optical scanning device, in which an amount of change in a relative scanning position of each scanning optical system is small, is obtained.

Next, a direction of change of a scanning position in a sub-scanning direction caused by a temperature fluctuation in the scanning optical systems that are arranged in the sub-scanning direction at both sides of the deflector 4 is described below. For example, in the scanning optical systems A and A', main rays of light in the fluctuated temperature shifts toward the front side of main rays of light in the ordinary temperature with respect to the rotating direction of the photoconductive element 8A between the deflector 4 and the optical path inflection mirror Ma1 in the scanning optical system A. In the scanning optical system A', main rays of light in the fluctuated temperature shifts toward the front side of main rays of light in the ordinary temperature with respect to the rotating direction of the photoconductive element 8A' between the deflector 4 and the optical path inflection mirror Ma'1.

Thus, the number of optical path inflection mirrors in the scanning optical systems A and A' is arranged to satisfy the expression described below in order to align a direction of change of a scanning position in a sub-scanning direction caused by a temperature fluctuation, for a number of optical path inflection mirrors provided in the scanning optical systems A' and A being respectively represented by "Q" (i.e., $Q \geq 2$) and "P" (i.e., $P \geq 1$), and where "k" is an integer equal to 0 or larger.

$$|Q-P|=2k \qquad (2)$$

The expression (2) indicates that a difference of the number of optical path inflection mirrors provided in each scanning optical system arranged in the sub-scanning direction becomes zero or an even number.

In the scanning optical systems A and A', one piece and three pieces of optical path inflection mirrors are provided, respectively, thereby satisfying the expression (2). Thus, the direction of change of the scanning position in the sub-scanning direction caused by the temperature fluctuation in the scanning optical systems A and A' is aligned. Two pieces of the optical path inflection mirrors are provided in each of the scanning optical systems B and B', thereby satisfying the expression (2). Hence, the direction of change of the scanning position in the sub-scanning direction caused by the temperature fluctuation in the scanning optical systems B and B' is aligned.

According to the example of the present invention as described above, the direction of change of the scanning position in the sub-scanning direction caused by the temperature fluctuation aligns in the scanning optical systems A and A' even if an optical axis of the imaging lenses 3A and 3A' changes due to the temperature fluctuation, when the difference of the number of optical path inflection mirrors in the scanning optical systems A and A' is equal to 0 or an even number. Thus, an amount of change in a relative scanning position of each scanning optical system is decreased.

In the example illustrated in FIG. 9, two scanning optical systems are arranged in the sub-scanning direction at both sides of the deflector 4. However, the number of scanning optical systems is not limited to this example. Namely, three or more numbers of scanning optical systems may be arranged. For example, when three scanning optical systems A, A', and A" are provided in the sub-scanning direction, the expression (2) needs to be satisfied in each set of scanning optical systems (i.e., A and A', A' and A", and A and A").

In addition, the number of scanning optical systems in the sub-scanning direction may not be same in both sides of the deflector 4. Namely, when the number of scanning optical systems in the sub-scanning direction provided at one side of the deflector 4 represents "S" (i.e., $S \geq 2$) while the number of scanning optical systems in the sub-scanning direction provided at the other side of the deflector 4 represents "T" (i.e., $T \geq 2$). The "S" and "T" are not always required to be equal in number (i.e., $S \neq T$). In the example illustrated in FIG. 9, the "S" and "T" are equal in number (i.e., two).

Next, another example of the present invention is described below. In the example illustrated in FIG. 1, the scanning optical systems A and B are provided at a position opposed to each other having the deflector 4 therebetween, and the scanning optical systems A and A' are provided in a sub-scanning direction. In this example, a plurality of scanning optical systems are arranged only in the sub-scanning direction. Namely, the scanning optical systems A and A' are provided but the scanning optical systems B and B' in FIG. 1 are not provided.

Components other than those described above are arranged similar to those in the above-described example. In this example, when the expression (2) is satisfied, a direction of change of a scanning position in a sub-scanning direction caused by a temperature fluctuation aligns. The number of scanning optical systems arranged in the sub-scanning direction is not limited to two, and may be equal to three or more. In this case, the expression (2) needs to be satisfied in an arbitary two scanning optical systems.

Namely, in an optical scanning device having a plurality of scanning optical systems A and A', an amount of change in a relative scanning position of each scanning optical system is decreased. The respective scanning optical systems A and A' include the semiconductor laser 1A or 1A',the deflector 4, scanning lenses 5A and 6A or 5A' and 6A', optical path inflection mirrors Ma1 or Ma'1, Ma'2 and Ma'3, and imaging lenses 3A or 3A'. The scanning lenses 5A, 6A, 5A', and 6A' condense rays of scanning light to a surface of a photoconductive element. The imaging lenses 3A and 3A' lead rays of light emitted from the semiconductor laser 1A or 1A' to the deflector 4. The deflector 4 scans rays of light emitted from the semiconductor laser 1A or 1A' and is commonly used in the scanning optical systems A and A'. Because the difference of the number of the optical path inflection mirrors in the scanning optical systems A and A' is equal to 0 or an even number, a direction of change of a scanning position in a sub-scanning direction caused by a temperature fluctuation aligns in scanning optical systems A and A' even if an optical axis of the imaging lenses 3A and 3A' changes due to the temperature fluctuation.

In the optical scanning devices described above, a resin lens is used as the imaging lens 3. Thus, the material costs for resin and the cost of processing the resin materials are decreased, as compared to the costs associated with a glass lens. Next, a construction of an image forming apparatus having the above-described optical scanning device is described below.

Figure 10:
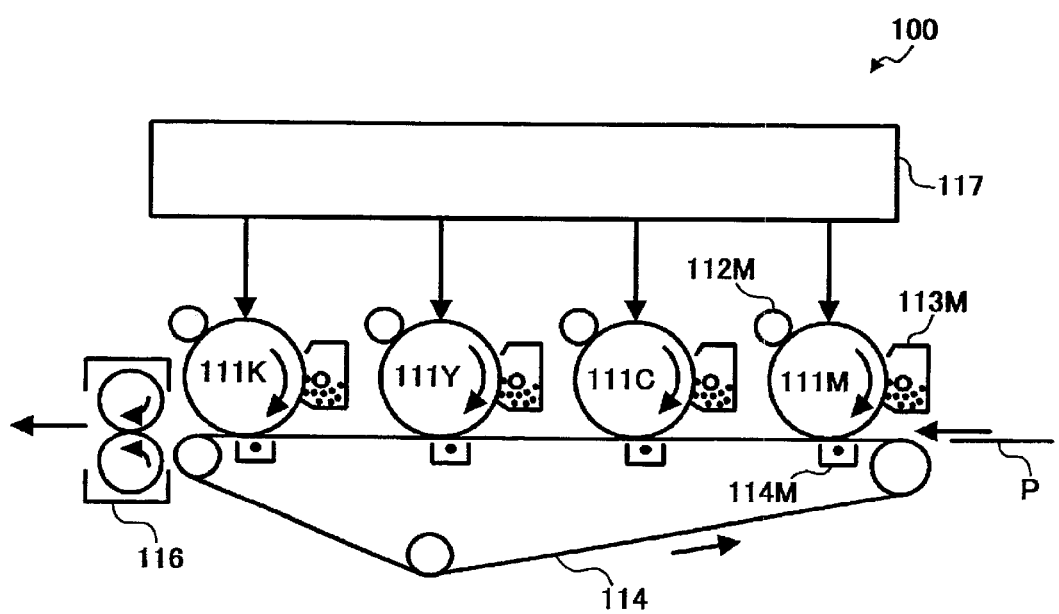
FIG. 10 is a schematic drawing illustrating a construction of a tandem image forming apparatus.

FIG. 10 is a schematic drawing illustrating a construction of a tandem image forming apparatus. An image forming apparatus 100 includes an optical scanning device 117, a transfer belt 114, and a fixing device 116. Above the transfer belt 114, photoconductive elements 111M, 111C, 111Y, and 111K for magenta (M), yellow (Y), cyan (C), and black (K) toner, respectively are arranged in order from an upstream to a downstream in a moving direction of the transfer belt 114.

Around the photoconductive element 111M, a charging device 112M, a developing device 113M, and a transfer device 114M are arranged to perform an electrophotographic printing process. A similar devices are arranged around the other photoconductive elements 111C, 111Y, and 111K. In the tandem image forming apparatus, when a printing mode using a plurality of colors is selected, each photoconductive element 111M, 111C, 111Y, and 111K is exposed by an exposure unit (not shown) based on an image signal corresponding to each color to form an electrostatic latent image on a surface of each photoconductive element 111M, 111C, 111Y, and 111K. Each electrostatic latent image is developed into a toner image with toner of respective colors. Each color toner image is electrostatically attracted onto the transfer belt 114. Each color toner image is then transferred onto a transfer sheet P one after another so that each color toner image is superimposed on each other.

The toner images transferred onto the transfer sheet P are then fixed. Then, the transfer sheet P having a multicolor image is discharged. When a single color printing mode is selected, photoconductive elements and related devices used for colors other than the selected color are put into a non-operating state. An electrostatic latent image is formed on a surface of a photoconductive element of the selected color. The electrostatic latent image is then developed into a toner image with toner of the selected color. The toner image is electrostatically attracted onto the transfer belt 114. The toner image is then transferred onto the transfer sheet P. The toner image transferred onto the transfer sheet P is then fixed. Then, the transfer sheet P having a single color image is discharged.

If the above-described optical scanning device is used as the optical scanning device 117 of the image forming apparatus 100, a direction of change of a scanning position in a sub-scanning direction on a photoconductive element corresponding to each color aligns even if an optical axis of a resin imaging lens in the optical scanning device 117 shifts to the sub-scanning direction due to a temperature fluctuation.

Thus, in the image forming apparatus 100, an amount of change in a relative scanning position of each scanning optical system is decreased, resulting in a production of a high quality image while obviating a creation of a color shift.

Obviously, numerous additional modifications and variations of the present invention are possible in light of the above teachings. It is therefore to be understood that within the scope of the appended claims, the present invention may be practiced otherwise than as specifically described herein.

This document claims priority and contains subject matter related to Japanese Patent Application No. 2000-402660, filed on Dec. 28, 2000, and the entire contents thereof are herein incorporated by reference.

What is claimed as new and is desired to be secured by Letters Patent of the United States is:

1. An optical scanning device, comprising:
 a plurality of scanning optical systems configured to scan different scanning surfaces, each of the scanning optical systems comprising:
  a light source configured to emit a light flux;
  a deflector configured to scan the light flux emitted from the light source, wherein the deflector is commonly used in the plurality of scanning optical systems;
  a plurality of scanning lenses configured to condense the scanned light flux to the scanning surface;
  an optical path inflection mirror configured to inflect the scanned light flux and to decrease an amount of change in a relative scanning position of each scanning optical system caused by a temperature fluctuation in the plurality of scanning optical systems;
  an imaging lens including a resin lens having a power in a sub-scanning direction and configured to lead the light flux emitted from the light source to the deflector; and
  a housing configured to support the light source and imaging lens,
  wherein the resin lens is directly affixed to the housing,
  wherein the plurality of scanning optical systems are provided in a sub-scanning direction, wherein a difference in a number of optical path inflection mirrors between two of the plurality of scanning optical systems is set to zero or an even number, and wherein the optical path inflection mirror is non-movable in position and configured among the plurality of scanning lenses.

2. The optical scanning device according to claim 1, wherein the optical path inflection mirror comprises two or more optical path inflection mirrors configured between a first grouping of the plurality of scanning lenses and a second grouping of the plurality of scanning lenses.

3. An image fanning apparatus, comprising:
 a transfer sheet feeding device; and
 an optical scanning device including a plurality of scanning optical systems configured to scan different scanning surfaces, each of the scanning optical systems comprising:
  a light source configured to emit a light flux;
  a deflector configured to scan the light flux emitted from the light source, wherein the deflector is commonly used in the plurality of scanning optical systems;
  a plurality of scanning lenses configured to condense the scanned light flux to the scanning surface;
  an optical path inflection mirror configured to inflect the scanned light flux and to decrease an amount of change in a relative scanning position of each scanning optical system caused by a temperature fluctuation in the plurality of scanning optical systems;
  an imaging lens including a resin lens having a power in a sub-scanning direction and configured to lead the light flux emitted from the light source to the deflector; and
  a housing configured to support the light source and imaging lens,
  wherein the resin lens is directly affixed to the housing,
  wherein the plurality of scanning optical systems are provided in a sub-scanning direction, wherein a difference in a number of optical path inflection mirrors between two of the plurality of scanning optical systems is set to zero or an even number, and wherein the optical path inflection mirror is non-movable in position and configured among the plurality of scanning lenses.

4. An optical scanning device, comprising:
 a plurality of scanning optical systems configured to scan different scanning surfaces, each of the scanning optical systems comprising:
  means for emitting a light flux;
  means for scanning the light flux emitted from the means for emitting, wherein the means for scanning is commonly used in the plurality of scanning optical systems;
  a plurality of means for condensing the scanned light flux to the scanning surface;
  means for inflecting the scanned light flux and decreasing an amount of change in a relative scanning position of each scanning optical system caused by a temperature fluctuation in the plurality of scanning optical systems;
  means including a resin lens having a power in a sub-scanning direction for leading the light flux emitted from the means for emitting to the means for scanning; and
  means for supporting the means for emitting and the means for leading the light flux,
  wherein the resin lens is directly affixed to the means for supporting,
  wherein the plurality of scanning optical systems are provided in a sub-scanning direction, wherein a difference in a number of the means for inflecting between two of the plurality of scanning optical systems is set to zero or an even number, and wherein the means for inflecting is non-movable in position and configured among the plurality of means for condensing.

5. The optical scanning device according to claim 4, wherein the means for inflecting comprises two or more optical path inflection mirrors configured between a first grouping of the plurality of means for condensing and a second grouping of the plurality of means for condensing.

6. An image forming apparatus, comprising:
 means for feeding a transfer sheet; and
 means including a plurality of scanning optical systems for scanning different scanning surfaces, each of the scanning optical systems comprising:

means for emitting a light flux;

means for scanning the light flux emitted from the means for emitting, wherein the means for scanning is commonly used in the plurality of scanning optical systems;

a plurality of means for condensing the scanned light flux to the scanning surface;

means for inflecting the scanned light flux and decreasing an amount of change in a relative scanning position of each scanning optical system caused by a temperature fluctuation in the plurality of scanning optical systems;

means including a resin lens having a power in a sub-scanning direction for leading the light flux emitted from the light source means to the deflector means; and a means for supporting the means for emitting and the means for leading the light flux, wherein the resin lens is directly affixed to the means for supporting, wherein the plurality of scanning optical systems are provided in a sub-scanning direction, wherein a difference in a number of the means for inflecting between two of the plurality of scanning optical systems is set to zero or an even number, and wherein the means for inflecting is non-movable in position and configured among the plurality of means for condensing.

7. A method for decreasing an amount of change in a relative scanning position, the method comprising:

providing a plurality of scanning optical systems to scan different scanning surfaces, each of the scanning optical systems comprising:

a light source to emit a light flux;

a deflector to scan the light flux emitted from the light source, wherein the deflector is commonly used in the plurality of scanning optical systems;

a plurality of scanning lenses configured to condense the scanned light flux to the scanning surface;

an optical path inflection mirror configured to inflect the scanned light flux and to decrease an amount of change in a relative scanning position of each scanning optical system caused by a temperature fluctuation in the plurality of scanning optical systems;

an imaging lens including a resin lens having a power in a sub-scanning direction and configured to lead the light flux emitted from the light source to the deflector; and a housing configured to support the light source and imaging lens, wherein the resin lens is directly affixed to the housing, wherein the plurality of scanning optical systems are provided in a sub-scanning direction, wherein a difference in a number of optical path inflection mirrors between two of the plurality of scanning optical systems is set to zero or an even number, and wherein the optical path inflection mirror is non-movable in position and configured among the plurality of scanning lenses.

* * * * *